United States Patent
Ohmura et al.

(10) Patent No.: US 6,972,402 B2
(45) Date of Patent: Dec. 6, 2005

(54) PHOTOELECTRIC ROTARY ENCODER (75) Inventors: Yoichi Ohmura, Tokyo (JP); Toru Oka, Tokyo (JP); Toshiro Nakashima, Tokyo (JP); Hajime Nakajima, Tokyo (JP); Hirokazu Sakuma, Tokyo (JP); Takashi Okamuro, Tokyo (JP); Masahiko Sakamoto, Tokyo (JP); Koichi Sugimoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 167 days.

(21) Appl. No.: 10/448,423

(22) Filed: May 30, 2003

(65) Prior Publication Data

US 2004/0004181 A1  Jan. 8, 2004

(30) Foreign Application Priority Data

Jun. 3, 2002 (JP) ............................. 2002-161317

(51) Int. Cl.$^7$ ............................................. G01D 5/34
(52) U.S. Cl. ........................... 250/231.13; 250/231.14; 341/13
(58) Field of Search ...................... 250/231.13, 231.14, 250/231.16, 231.17, 231.18, 237 R, 216, 250/239; 341/11, 13

(56) References Cited

U.S. PATENT DOCUMENTS

| 4,152,589 A |   | 5/1979  | Mitchell |
|---|---|---|---|
| 4,650,995 A | * | 3/1987  | Tokunaga et al. ...... 250/227.28 |
| 4,769,537 A |   | 9/1988  | Taillebois et al. |
| 6,803,560 B1 | * | 10/2004 | Okumura et al. ...... 250/231.16 |

FOREIGN PATENT DOCUMENTS

| JP | 56-046403 A | 4/1981 |
|---|---|---|
| JP | SHO 64-13163 U | 1/1989 |
| JP | 08-068665 A | 3/1996 |
| JP | 11-153702 A | 6/1999 |

* cited by examiner

Primary Examiner—Kevin Pyo
(74) Attorney, Agent, or Firm—Leydig, Voit & Mayer, Ltd.

(57) ABSTRACT

A photoelectric rotary encoder includes a light source that emits a light beam, a returning section that returns the emitted light beam to a direction opposite to an emitting direction of the beam, and a photodetector that is disposed on a substrate on which the light source is disposed and that detects the returned light beam via a disk having a detection pattern section. The photoelectric rotary encoder detects rotational displacement of the disk based on the detected returned light beam. In this photoelectric rotary encoder, an optical element that lets a stray beam component of the light beam from the light source escape via a side surface of the optical element, is disposed in front of the substrate on which the light source and the photodetector are disposed. The optical element covers the substrate and integrates the optical element and the substrate.

15 Claims, 8 Drawing Sheets

SIDE VIEW OBSERVED FROM A

FIG.8B

SIDE VIEW OBSERVED FROM B

PHOTOELECTRIC ROTARY ENCODER

BACKGROUND OF THE INVENTION

1) Field of the Invention

The present invention relates to a photoelectric rotary encoder that can detect a rotation angle, a rotational speed and the like of a rotating unit. More particularly, this invention relates to providing a photoelectric rotary encoder that has a small size and that can be assembled with high accuracy.

2) Description of the Related Art

A photoelectric rotary encoder is a kind of a sensor that is used to detect rotation angle, rotation number, rotational speed and the like of a rotating unit as digital signals. Particularly, the photoelectric rotary encoder is widely used in various fields of industrial machinery such as in a robot and machine tool, as a sensor that detects a position and a rotational speed of a motor and transmits information to a controller.

A conventional return type rotary encoder has a light source and a light detector arranged on a first side of the encoder, and a return section arranged on a second side, across a disk from the first side. The encoder has a return section that returns light emitted from the light source, to the light detector at the second side of the encoder. The encoder further has a light shielding plate that removes stray light leaking from the light source without passing through the return section. This kind of return type rotary encoder is disclosed in U.S. Pat. No. 4,152,589, for example, as a conventional technique.

The conventional return type rotary encoder has the light source and the light detector disposed close to each other at one side of the encoder. Therefore, it is not possible to widen the beam from the light source to avoid the generation of stray light directly leaking from the light source and into the light detector. Consequently, there is a limit to reducing distance between the light source and the returning section, and thus there is a constraint in reducing the size of the encoder. It is also necessary to provide components such as a light shielding plate (corresponding to a stator in the conventional technique) and, the like, and as a result, the encoder requires many components. Further, since the light source and the light detector are different components, it is hard to align, with high accuracy, the light source, the light detector, and the returning section.

SUMMARY OF THE INVENTION

It is an object of the present invention to at least solve the problems in the conventional technology.

The photoelectric rotary encoder according to one aspect of the present invention includes a disk having a detection pattern; a substrate arranged on one side of the photoelectric rotary encoder; a light source that is arranged on the substrate and emits a beam; a first optical element that is arranged on other side across the disk from the one side and guides the beam to the substrate so that the beam passes through the detection pattern; a photodetector that is arranged on the substrate and receives the beam guided to detect a rotation displacement of the disk and; a second optical element that is integrated into the substrate at a side where the light source and the photodetector are arranged, and guides stray beam components of the beam to a side of the second optical element.

The photoelectric rotary encoder according to another aspect of the present invention includes a disk having a detection pattern; a substrate arranged on one side of the photoelectric rotary encoder; a light source that is arranged on the substrate and emits a beam; a first optical element that is arranged on other side across the disk from the one side, has a phase grating that branches the beam into a first beam and a second beam, and guides the first and second beams to the substrate so that the beam passes through the detection pattern; a first photodetector that is arranged on the substrate and receives the first beam guided to detect a rotation displacement of the disk; a second photodetector that is arranged on the substrate and receives the second beam guided to detect the rotation displacement; and a second optical element that is integrated into the substrate at a side where the light source and the first and second photodetectors are arranged, and guides stray beam components of the beam to a side of the second optical element.

The photoelectric rotary encoder according to still another aspect of the present invention includes a disk having a detection pattern; a substrate arranged on one side of the photoelectric rotary encoder and has a first concavity and a second concavity; a light source that is arranged on a bottom face of the first concavity and emits a beam; an optical element that is arranged on other side across the disk from the one side and guides the beam to the substrate so that the beam passes through the detection pattern; and a photodetector that is arranged on a bottom face of the second concavity and receives the beam guided to detect a rotation displacement of the disk.

The other objects, features and advantages of the present invention are specifically set forth in or will become apparent from the following detailed descriptions of the invention when read in conjunction with the accompanying drawings.

DETAILED DESCRIPTION

Exemplary embodiments of the photoelectric rotary encoder according to the present invention will be explained in detail below with reference to the accompanying drawings.

Figure 1:
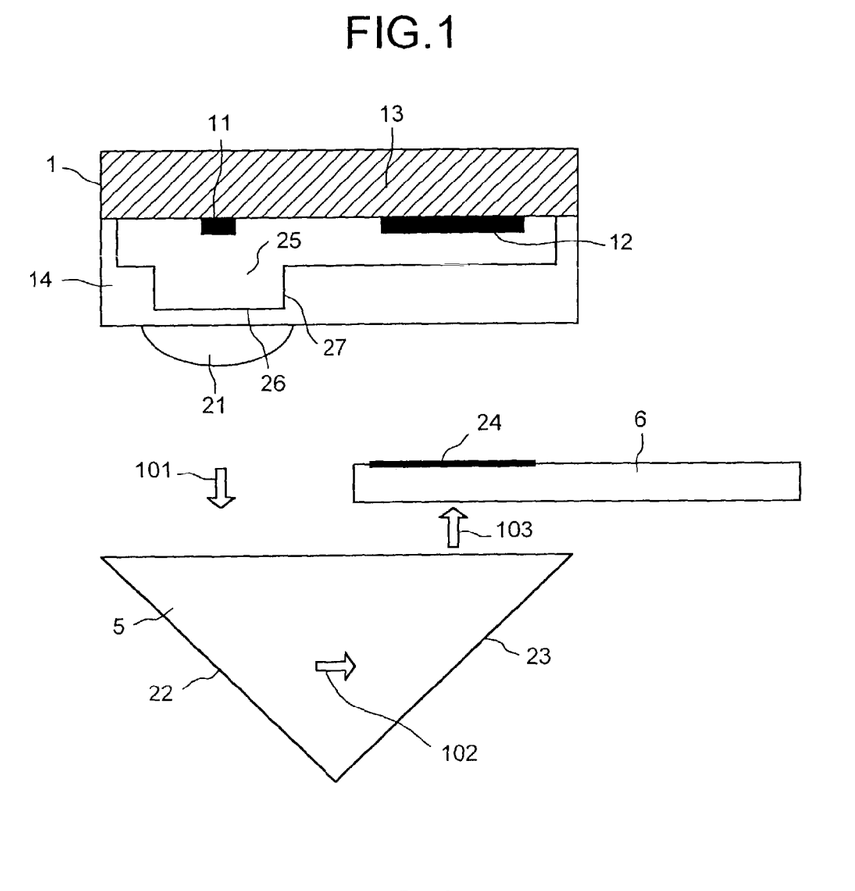
FIG. 1 is a structure diagram that schematically illustrates a main section of a photoelectric rotary encoder according to a first embodiment of the present invention.

FIG. 1 is a structure diagram that schematically illustrates a main section of a photoelectric rotary encoder according to a first embodiment of the present invention. As shown in FIG. 1, the photoelectric rotary encoder includes a light source and detection module 1, a returning section 5, and a disk 6.

The light source and detection module 1 includes a light source 11, a photodetector 12, a substrate 13, an optical element 14, and a first lens 21. The light source 11 and the photodetector 12 are mounted on a substrate 13. The optical element 14 is fitted on the substrate 13 to cover the light source 11 and the photodetector 12. The first lens 21 is provided on the surface of the optical element 14. The light source and detection module 1 also has a cylindrical cavity 25 that has a smaller outside diameter than that of the first lens 21. The cylindrical cavity 25 has an aperture 26 and a side face 27 to form the aperture 26.

The returning section 5 has a reflection surface 22 and a reflection surface 23. The reflection surface 22 reflects a beam 101 emitted from the light source 11 and then condensed by the first lens 21. The reflection surface 23 reflects a beam 102 reflected from the reflection surface 22, toward the light source and detection module 1. The reflection surface 23 is arranged such that an incident angle of the beam 101 with respect to the reflection surface 22 becomes 45 degrees. As a result, the reflection surface 22 totally reflects the beam 101 to the reflection surface 23. The reflection surface 23, moreover, is arranged such that an incident angle of the beam 102 with respect to the reflection surface 23 becomes 45 degrees. That is, the reflection surface 23 totally reflects the beam 102. Therefore, a beam 103 that is reflected from the reflection surface 23 is reflected toward the light source and detection module 1. When the beam 101 condensed by the first lens 21 is a parallel light, the beam 103 reflected from the reflection surface 23 also becomes a parallel beam.

The disk 6 has a detection pattern section 24 that is featured to detect, for example, a rotation angle. When the rotating disk 6 is irradiated with the beam 103, the detection pattern section 24 on the disk 6 modulates the beam 103. The photodetector 12 receives the modulated beam 103 via the optical element 14. Based on the detection by the photodetector 12, it is possible to obtain necessary information such as a rotation angle, a rotational speed, and a rotation number.

Figure 2:
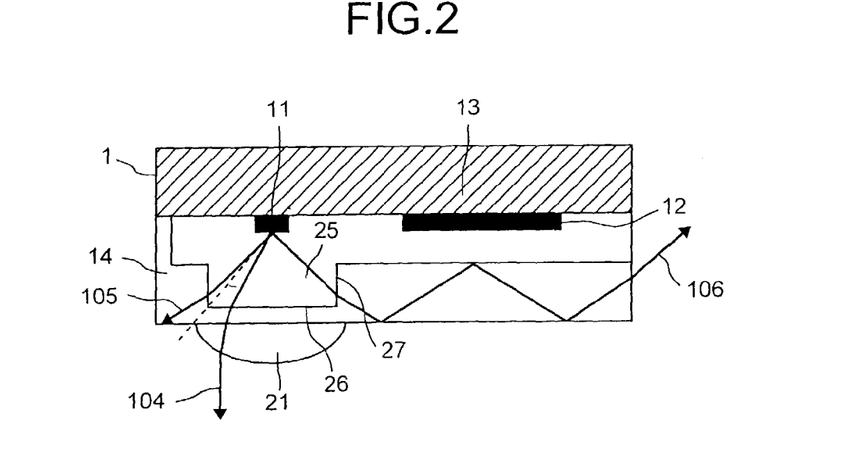
FIG. 2 is a diagram to explain about a state that a beam stray component escapes to the outside of a light source and detection module by repeating a reflection, in the light source and detection module shown in FIG. 1.

FIG. 2 is a diagram to explain about a state that a beam stray component escapes to the outside of the light source and detection module by repeating a reflection, in the light source and detection module shown in FIG. 1. In FIG. 2, the optical element 14 is made of polycarbonate having a refractive index of 1.58, which is a value measured at the wavelength of the sodium D-line. The aperture 26 of the optical element 14 is formed so as to be located inside a cone the top of which is in contact with the light source 11 and the central axis of which coincides with the optical axis of the beam emitted from the light source 11. The cone particularly has a vertical angle of 90 degrees.

The diameter of the first lens 21 is designed slightly larger than that of the cylindrical cavity 25. Based on this design, a component of light emitted from the light source 11 within an angular range not larger than 45 degrees from the optical axis passes through the first lens 21 from the aperture 26 of the cylindrical cavity 25. This light component proceeds to the returning section not shown. On the other hand, a component of light emitted from the light source 11 within an angular range larger than 45 degrees from the optical axis is refracted at the side face 27 of the cylindrical cavity 25. This light component repeats a total reflection between the upper face and the lower face of the optical element 14 disposed to form a right angle with the side face 27. This light component proceeds to the outside of the light source and detection module 1.

For example, a beam 104 of FIG. 2 is a light component having an angle not larger than 45 degrees from the optical axis, and this beam 104 is incident on the first lens 21 and proceeds to the returning section 5. A beam 105 of FIG. 2 is a light component having an angle larger than 45 degrees from the optical axis. This beam 105 proceeds to the outside of the optical element 14 from the side face 27 of the cylindrical cavity 25, without passing through the first lens 21. This beam 105 does not proceed to the returning section 5.

As shown in FIG. 2, consider a beam 106 that has an angle of 50 degrees from the optical axis and that proceeds to the photodetector 12. In other words, this beam 106 has an incident angle of 40 degrees from the side face 27 and is refracted on the incident surface at a refraction angle of about 24 degrees. This beam 106 is incident on the lower face of the optical element 14 at the incident angle of about 66 degrees. When the optical element 14 is made of polycarbonate having the refractive index of 1.58, a critical angle of the beam on the lower face of the optical element 14 is 39.3 degrees. Therefore, the total of the beam 106 is reflected.

Similarly, the beam 106 is totally reflected on the upper face of the optical element 14 and finally proceeds to the outside from the side of the optical element 14. Consequently, the beam 106 does not reach the photodetector 12. The stray beam component that proceeds from the light source 11 to the photodetector 12 is eliminated in this way.

The first lens 21 is formed on the optical element 14, and the optical element 14, the light source 11, and the photodetector 12 are integrated. Therefore, it is possible to greatly reduce the sizes of the encoder from the sizes of the conventional encoder. Moreover, the optical element 14 is integrated into the substrate 13. In other words, the relative position between the optical element 14 and the substrate 13 on which the light source 11, and the photodetector 12 are mounted is fixed. Since the light source 11 and the photodetector 12 are integrated together, it is possible to adjust the optical axis by integrally moving both elements, and it is also possible to simplify and facilitate the assembling and adjustment. While the reflection surface 22 and the reflection surface 23 are the total reflection surfaces in the first embodiment, it is also possible to provide a similar structure when reflection surfaces of a mirror or the like are used instead of the total reflection surfaces.

As explained above, according to the first embodiment, since the first lens 21 is formed on the optical element 14, it is easily possible to emit a light beam toward a desired direction. Further, the cylindrical concavity 25 is formed such that it has a smaller outside diameter than that of the first lens 21, and has the aperture 25 and the side face 27. Therefore, it is possible to obtain a photoelectric rotary encoder that can cause the stray beam component directed to the photodetector 12 to escape to the outside of the light source and detection module without passing through the lens 21 while confining this component inside of the optical element 14 based on the total reflection. With this arrangement, it is possible to prevent the stray beam component from being incident on the photodetector 12.

Further, the optical element 14, the light source 11, and the photodetector 12 are integrated, and the first lens 21 is formed on the optical element 14. Therefore, it is possible to obtain a photoelectric rotary encoder that has a more compact light source and detection module 1, and the photoelectric rotary encoder make adjustment between the light source 11 and the photodetector 12 easy.

In the first embodiment, the cavity 25 formed in the optical element 14 has a cylindrical shape in order to reduce influence of the stray beam component. However, the shape is not limited to the cylindrical shape. It is possible to obtain similar effects when the concavity has any other shape so long as the stray beam component escapes to the outside of the light source and detection module 1 while confining this component to the inside of the optical element 14 by the total reflection.

Figure 3:
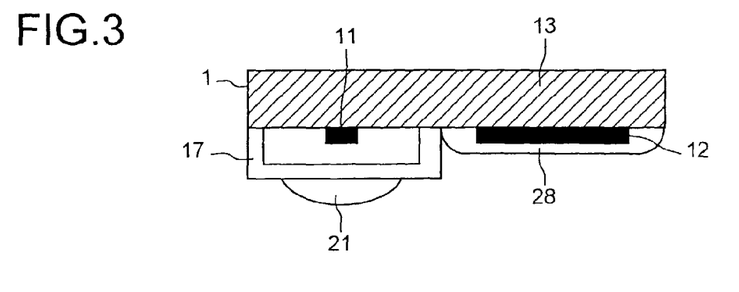
FIG. 3 is a schematic structure diagram of a light source and detection module of a photoelectric rotary encoder according to a second embodiment of the present invention.

FIG. 3 is a schematic structure diagram of a light source and detection module of a photoelectric rotary encoder according to a second embodiment of the present invention. The structure of the photoelectric rotary encoder is different from that of the first embodiment shown in FIG. 1 in that only the light source 11 is covered with an optical element 17, and that the photodetector 12 is sealed with silicon 28. This. photoelectric rotary encoder also has the returning section 5 and the disk 6 that are similar to those shown in FIG. 1, and therefore, these components are not shown in FIG. 3. According to the structure of the second embodiment, it is possible to make the optical element much smaller. Therefore, this structure has an advantage in that it is possible to make the light source and detection module 1 much smaller.

As explained above, according to the second embodiment, the light source 11 is covered with the optical element 17, and the photodetector 12 is sealed with silicon 28. Therefore, it is possible to obtain a more compact photoelectric rotary encoder.

Figure 4A:
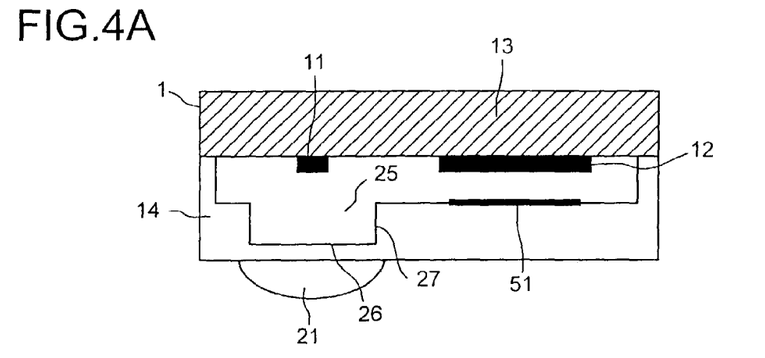
FIGS. 4A and 4B are schematic structure diagrams of a light source and detection module of a photoelectric rotary encoder according to a third embodiment of the present invention.
Figure 4B:
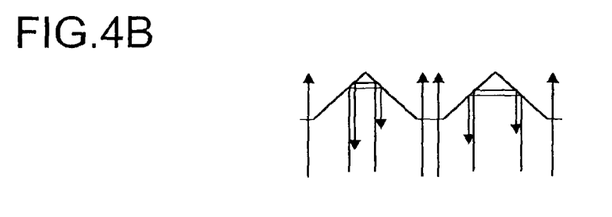

FIG. 4A is a schematic structure diagram of a light source and detection module 1 of a photoelectric rotary encoder according to a third embodiment of the present invention. The structure of the photoelectric rotary encoder is different from that of the first embodiment shown in FIG. 1 in that a fixed slit 51 is provided at a portion of the optical element 14 facing the photodetector 12. FIG. 4B is an enlarged sectional view of the fixed slit 51. As shown in FIG. 4B, the fixed slit 51 has V-shape grooves on which beams from the returning section are incident at 45 degrees. and thus selectively shields an incident beam. Other structures such as the returning section 5 and the disk 6 are similar to those shown in FIG. 1, and therefore, these items are not shown in FIG. 4A.

For example, when the optical element 14 is made of polycarbonate having the refractive index of 1.58, the critical angle of a beam is 39.3 degrees. Therefore, the total of a parallel beam that is incident on the V-shape grooves of the fixed slit 51 is reflected, and thus is shielded. That is, it is possible to provide the photoelectric rotary encoder with the light-shielding slit by merely processing the V-shape grooves on the optical element 14. It is also possible to provide with the V-shape grooves as an amplitude grating by reducing the sizes and the layout period of the V-shape grooves. Moreover, reducing greatly the layout period of the V-shape grooves allows the light source and detection module 1 to completely shield the beam from the returning section 5.

As explained above, according to the third embodiment, the fixed slit 51 having the V grooves is provided on the portion of the optical element 14 that faces the photodetector 12. Therefore, it is possible to obtain a photoelectric rotary encoder that is formed with the light-shielding slit or the amplitude grating, based on a simple processing of the optical element 14.

Figure 5:
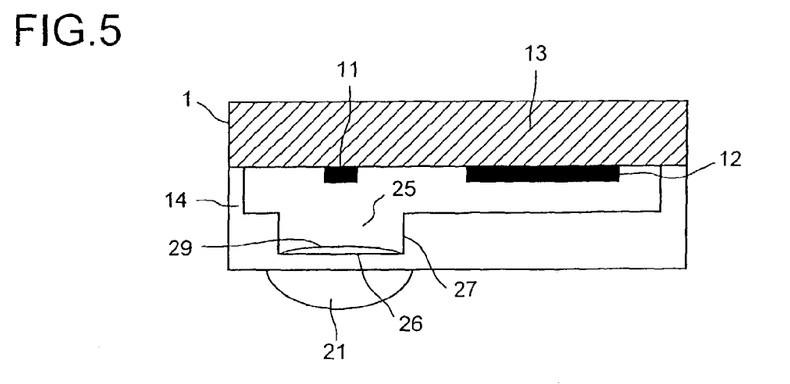
FIG. 5 is a schematic structure diagram of a light source and detection module of a photoelectric rotary encoder according to a fourth embodiment of the present invention.

FIG. 5 is a schematic structure diagram of a light source and detection module of a photoelectric rotary encoder according to a fourth embodiment of the present invention. The structure of the photoelectric rotary encoder is different from that of the first embodiment shown in FIG. 1 in that a rear surface lens 29 is provided on the rear side of the first lens 21. Other structures such as the returning section 5 and the disk 6 are also similar to those shown in FIG. 1, and therefore, these components are not shown in FIG. 5.

As a result, it is possible to improve the parallelism of a beam emitted from the optical element 14, as compared with when only one lens is used. Moreover, this photoelectric rotary encoder may allow the light source and detection module to provide with a diffraction grating using concavities, convexities, and V-shape grooves in addition to lenses, on a plurality of surfaces of the optical element 14. By this diffraction grating, the optical function and performance of the photoelectric rotary encoder is more improved.

As explained above, according to the fourth embodiment, the rear surface lens 29 is provided on the rear side of the first lens 21 of the optical element 14. Therefore, it is possible to obtain a photoelectric rotary encoder parallelism of the beam emitted from the optical element 14 of which and optical function and performance of which are further improved.

Figure 6:
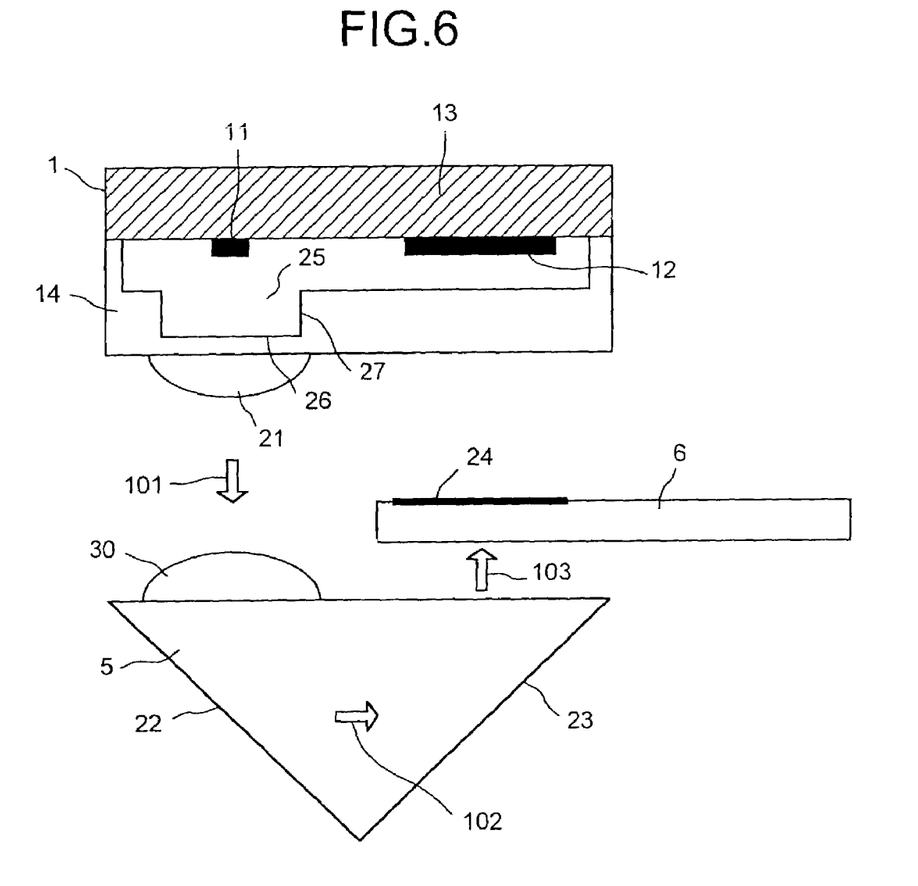
FIG. 6 is a schematic structure diagram of a main section of a photoelectric rotary encoder according to a fifth embodiment of the present invention.

FIG. 6 is a schematic structure diagram of a main section of a photoelectric rotary encoder according to a fifth embodiment of the present invention. The structure of the photoelectric rotary encoder is different from that of the first embodiment shown in FIG. 1 in that a second lens 30 is provided on the returning section 5. Other structures are similar to those of the first embodiment, and identical portions are attached with like reference numerals. Like in the first embodiment, the light source 11 emits a beam. The first lens 21 condense the beam to obtain the beam 101, and the second lens 30 condense the beam 101 to obtain the beam 102. The reflection surface 22 and the reflection surface 23 of the returning section 5 make the total reflection of the beam 102. The detection pattern section 24 on the rotating disk 6 modulates the beam 103. The photodetector 12 receives the modulated beam via the optical element 14.

According to the fifth embodiment, the second lens 30 is provided on the returning section 5. As a result, adjustment of the distance between the lenses 21 and 30 allows the photoelectric rotary encoder to improve the optical performance. For example, it is possible to enlarge the irradiation diameter and improve the parallelism. Further, based on the combination of such lenses, it is possible to reduce the curvature of each lens. Therefore, it is possible to overcome a trade off with the mounting accuracy of the first lens 21 and the assembling accuracy of the returning section 5 and thus it is possible to achieve easiness of designing the encoder.

Figure 7:
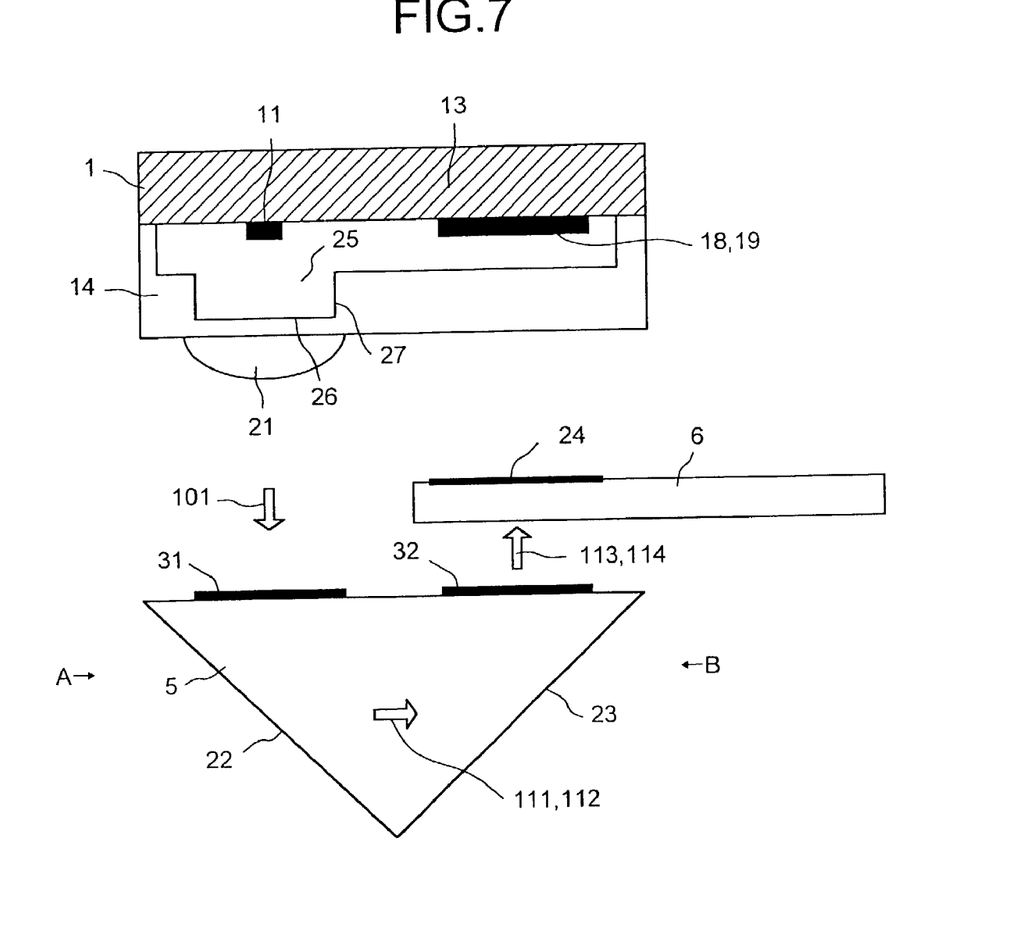
FIG. 7 is a schematic structure diagram of a main section of a photoelectric rotary encoder according to a sixth embodiment of the present invention.
Figure 8A:
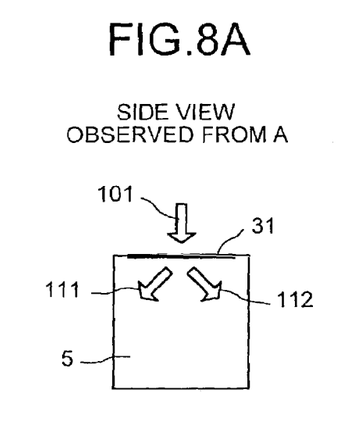
FIGS. 8A and 8B are side views of a returning section shown in FIG. 7.
Figure 8B:
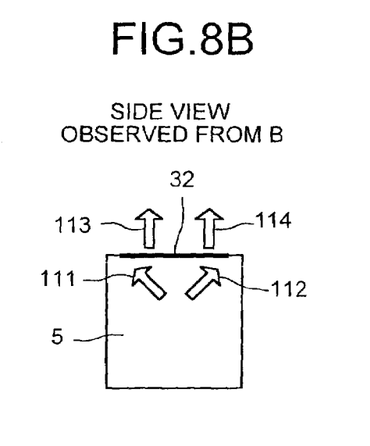

FIG. 7 is a schematic structure diagram of a main section of a photoelectric rotary encoder according to a sixth embodiment of the present invention. The structure of the photoelectric rotary encoder is different from that of the first embodiment shown in FIG. 1 in that the encoder has a first photodetector 18 and a second photodetector 19 in place of the photodetector 12. Also, the structure of the photoelectric rotary encoder is different in that the encoder has a first phase grating 31 on the beam incident surface of the returning section 5 and a second phase grating 32 on the beam exit surface of the returning section 5. The phase gratings 31, 32 is provided as concave and convex surfaces having an optical path difference $\lambda/2$. FIG. 8A is a side view of the returning section 5 shown in FIG. 7 observed from an arrow mark A, and FIG. 8B is a side view of the returning section 5 shown in FIG. 7 observed from an arrow mark B. In FIG. 7 and FIGS. 8A and 8B, portions that are identical with those in the first embodiment are attached with like reference numerals.

Referring to FIGS. 8A and 8B, the beam 101 emitted from the first lens 21 is incident on the phase grating 31 of the returning section 5. Based on the diffraction, the beam 101 is branched into a plus first order (+1) beam 111 and a minus first order (−1) beam 112. The reflection surface 22 is arranged such that the incident angles of the beam 111 and the beam 112 become 45 degrees. The reflection surface 22 totally reflects both beams to the reflection surface 23. The reflection surface 23 is also arranged such that the incident angles of the beam 111 and the beam 112 become 45 degrees respectively. The reflection surface 23 totally reflects the beam 111 and the beam 112 to the light source and detection module 1. The phase grating 32 of the returning section 5 deflects a beam 113 as a minus first order (−1) beam of the beam 111, and a beam 114 as a plus first order (+1) beam of the beam 112, to the disk 6. The beam 113 and the beam 114 irradiate the detection pattern section 24 featured to detect a rotation angle of the disk 6. The detection pattern section 24 modulates the beam 113 and the beam 114. The first photodetector 18 and the second photodetector 19 receive the modulated beams of the beam 113 and the beam 114 respectively.

As a result, so long as the beam 101 irradiates the phase grating 31, the phase grating 31 can divide the beam 101 uniformly. Therefore, it is easy to optically align the light source 11 and the returning section 5, and it is also possible to improve the assembling accuracy. It is possible to control the optical distance between the phase grating 31 and the phase grating 32, based on the shape of the returning section 5. Therefore, it becomes easy to manage the distance between the two gratings. Further, it is possible to provide a fixed slit having V-shape grooves in place of the phase gratings, and it is possible to add functions of a shielding of a selective beam, and a diffraction and branching of a beam using an amplitude grating having V-shape grooves.

As explained above, according to the sixth embodiment, the first photodetector 18 and the second photodetector 19 are provided in the light source and detection module 1, and the first phase grating 31 and the second phase grating 32 are provided on the returning section 5. Therefore, the photoelectric rotary encoder facilitates the optical alignment, and improves assembling accuracy. It is also possible to obtain a multi-functional photoelectric rotary encoder that can shield a selective beam, diffract a beam, and branch a beam into a plurality of beams.

Figure 9:
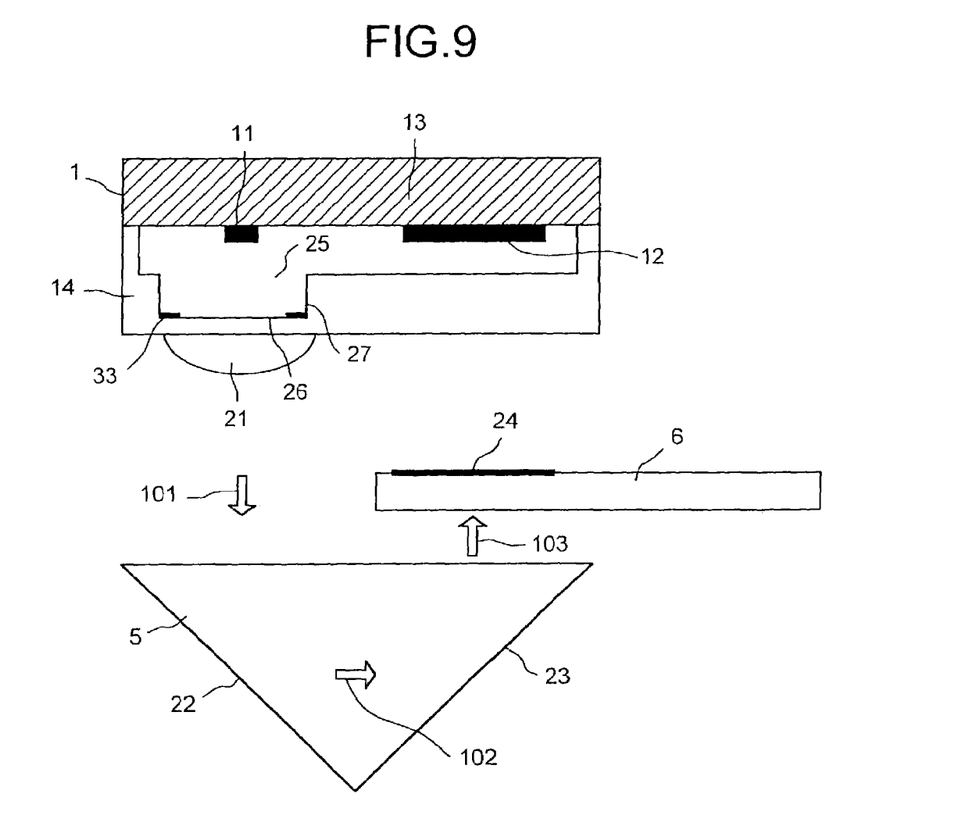
FIG. 9 is a schematic structure diagram of a main section of a photoelectric rotary encoder according to a seventh embodiment of the present invention.
Figure 10:
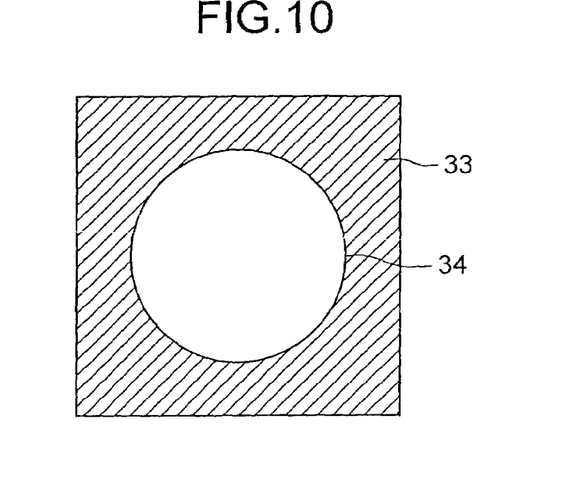
FIG. 10 is a circular chromium pattern observed from a light source side.

FIG. 9 is a schematic structure diagram of a main section of a photoelectric rotary encoder according to a seventh embodiment of the present invention. The structure of the photoelectric rotary encoder is different from that of the first embodiment shown in FIG. 1 in that a circular chromium pattern 33 having a smaller diameter than that of the first lens 21 is provided on the inner surface of the optical element 14. Other structures are similar to those of the first embodiment, and identical portions are attached with like reference numerals. FIG. 10 is the circular chromium pattern 33 observed from the light source 11 side. As shown in FIG. 10, the circular chromium pattern 33 has an internal edge 34.

Since the circular chromium pattern 33 is formed on the optical element 14, the beam that passed through the circle of the circular chromium pattern 33 becomes a circular beam by the internal edge 34. Other chromium pattern than a circular pattern may be used in place of the circular chromium pattern 33 to form a desired beam pattern. It is also possible to apply this structure to remove a stray beam, in addition to the formation of a beam. Further, it is also possible to selectively shield a beam by providing a fixed slit, which is formed by a chromium pattern, on the surface of the optical element 14 above the photodetector 11.

As explained above, according to the seventh embodiment, the circular chromium pattern 33 having a smaller diameter than that of the first lens is provided on the inner surface of the optical element 14. Therefore, it is possible to obtain a multi-functional photoelectric rotary encoder that can form a beam, shield a selective beam, and remove a stray beam.

Figure 11:
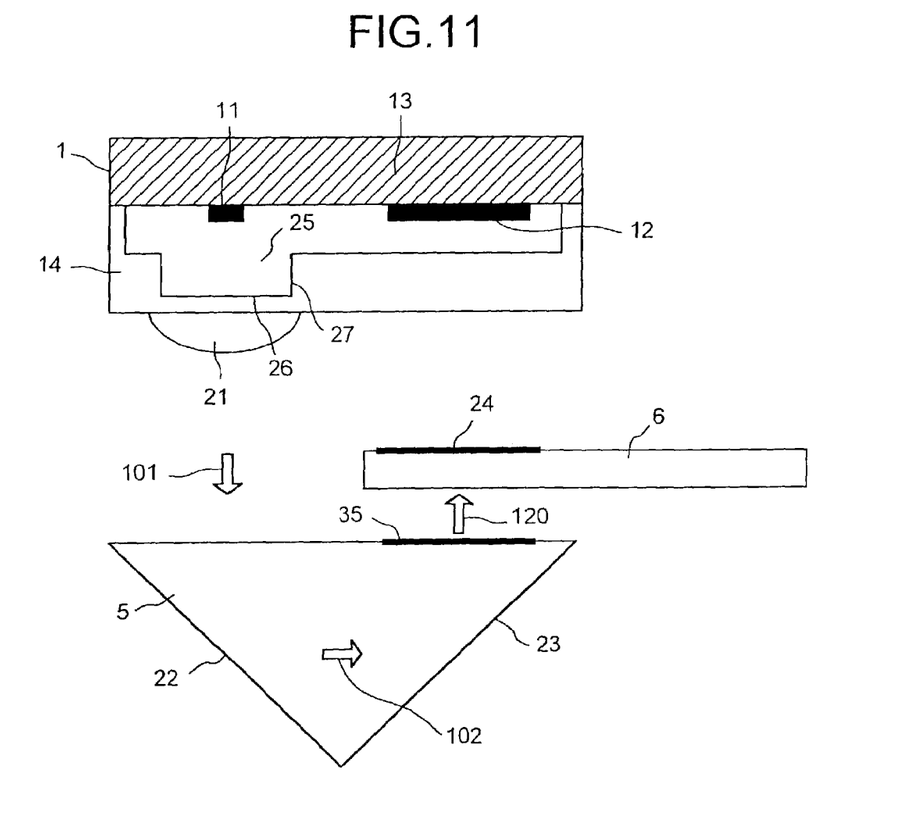
FIG. 11 is a schematic structure diagram of a main section of a photoelectric rotary encoder according to an eighth embodiment of the present invention.

FIG. 11 is a schematic structure diagram of a main section of a photoelectric rotary encoder according to an eighth embodiment of the present invention. The structure of the photoelectric rotary encoder is different from that of the first embodiment shown in FIG. 1 in that a fixed slit using a chromium pattern 35 is provided on the emission surface that faces the disk 6 of the returning section 5. Other structures are similar to those of the first embodiment, and identical portions are attached with like reference numerals.

As shown in FIG. 11, the fixed slit is provided as the chromium pattern 35 in the returning section 5. However, the shape of the chromium pattern 35 is not limited to the fixed slit. For example, the chromium pattern 35 may be provided as a diffraction grating to diffract or branch a beam. Moreover, when the chromium pattern 35 is a circular chromium pattern, it is possible to easily change the shape of a parallel beam into circle shape.

As explained above, according to the eighth embodiment, the fixed slit using the chromium patterns is provided on the emission surface of the returning section 5. Therefore, it is possible to obtain a multi-functional photoelectric rotary encoder that can form a beam or branch a beam into a plurality of beams.

Figure 12:
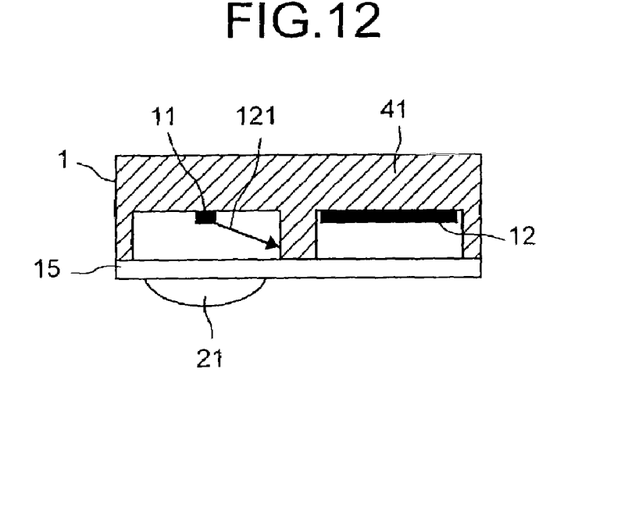
FIG. 12 is a schematic structure diagram of a light source and detection module of a photoelectric rotary encoder according to a ninth embodiment of the present invention.

FIG. 12 is a schematic structure diagram of a light source and detection module 1 of a photoelectric rotary encoder according to a ninth embodiment of the present invention. The structure of the photoelectric rotary encoder is different from that of the first embodiment shown in FIG. 1 in that the light source 11 and the photodetector 12 are mounted on a substrate 41, that an optical element 15 having the first lens 21 is fitted to this substrate 41, and that the substrate 41 has a light shielding section between the light source 11 and the photodetector 12. Particularly, the structure of the photoelectric rotary encoder is largely different from that of the first embodiment in that the optical element 15 does not have a cylindrical cavity. Other structures are similar to those of the first embodiment, and identical portions are attached with like reference numerals. The structures of the returning section 5 and the disk 6 are similar to those shown in FIG. 1, and therefore, these components are not shown in FIG. 12.

As a result, a stray beam like a beam 121 directed from the light source 11 to the photodetector 12 without passing through the first lens 21 is shield by the light shielding section of the substrate 41. Therefore, it is not necessary to provide a cylindrical cavity within the optical element 15, unlike the structures according to the first and other embodiments.

As explained above, according to the ninth embodiment, the substrate on which the light source 11 and the photodetector 12 are mounted has the light shielding section between the light source 11 and the photodetector 12. Therefore, it is possible to obtain a photoelectric rotary encoder that removes the stray beam component directed from the light source 11 to the photodetector 12. Further, since it is not necessary to provide a cylindrical cavity within the optical element 15, photoelectric rotary encoder facilitates the designing of the optical element 15.

Figure 13:
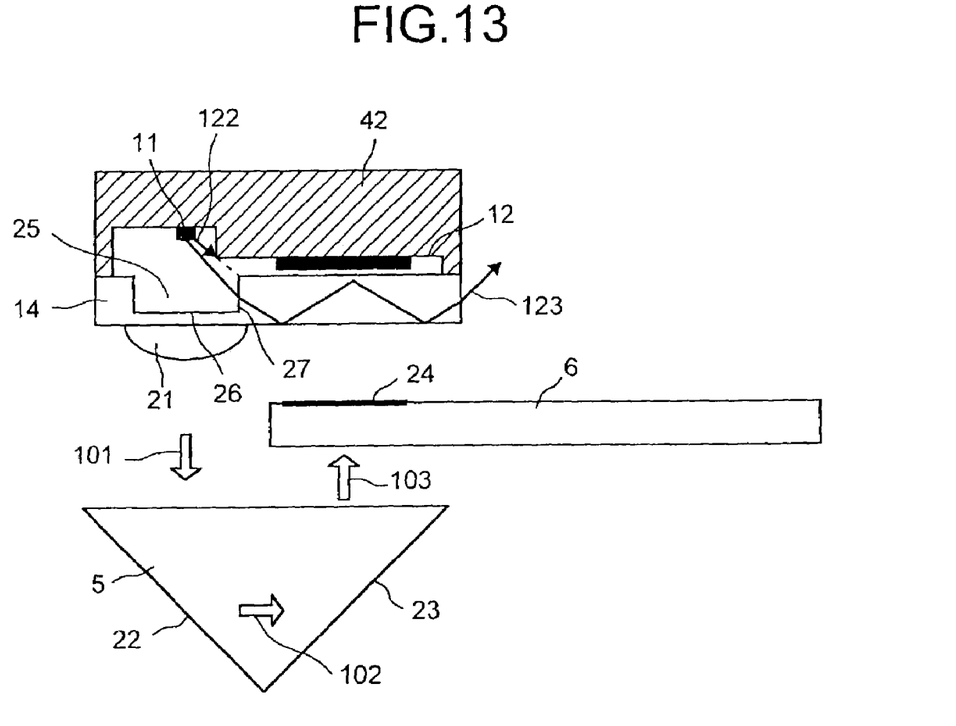
FIG. 13 is a schematic structure diagram of a light source and detection module of a photoelectric rotary encoder according to a tenth embodiment of the present invention.

FIG. 13 is a schematic structure diagram of a light source and detection module 1 of a photoelectric rotary encoder according to a tenth embodiment of the present invention. The structure of the photoelectric rotary encoder is different from that of the first embodiment shown in FIG. 1 in that a step is formed between a base on which the light source 11 is provided and the other base on which the photodetector 12 is provided, and each of the bases is a portion of a substrate 42. Moreover, the photodetector 12 is set slightly closer to the disk 6 than the light source 11. Other structures are similar to those of the first embodiment, and identical portions are attached with like reference numerals.

The step has a position, a height, and a shape depending on the shape of the substrate 42 and can shield a stray beam component like a beam 122 directed from the light source 11 to the photodetector 12. Moreover, a stray beam component like a beam 123 directed from the light source 11 to the photodetector 12 is incident on the side face 27 of the cylindrical cavity 25, and is led to the outside of the light source and detection module 1 through the optical element 14. Further, it is also possible to adjust a distance between the detection pattern section 24 on the disk 6 and the photodetector 12, which is an important optical characteristic, based on the shape of the substrate 42.

As explained above, according to the tenth embodiment, the step is formed between the bases on which the light source 11 and the photodetector 12 are provided respectively, and the mounting position of the photodetector 12 is set slightly closer to the disk than that of the light source. Therefore, it is possible to obtain a photoelectric rotary encoder that can shield the stray beam component directed from the light source 11 to the photodetector 12 without passing through the lens, or escape the stray beam to the outside of the light source and detection module 1.

Figure 14:
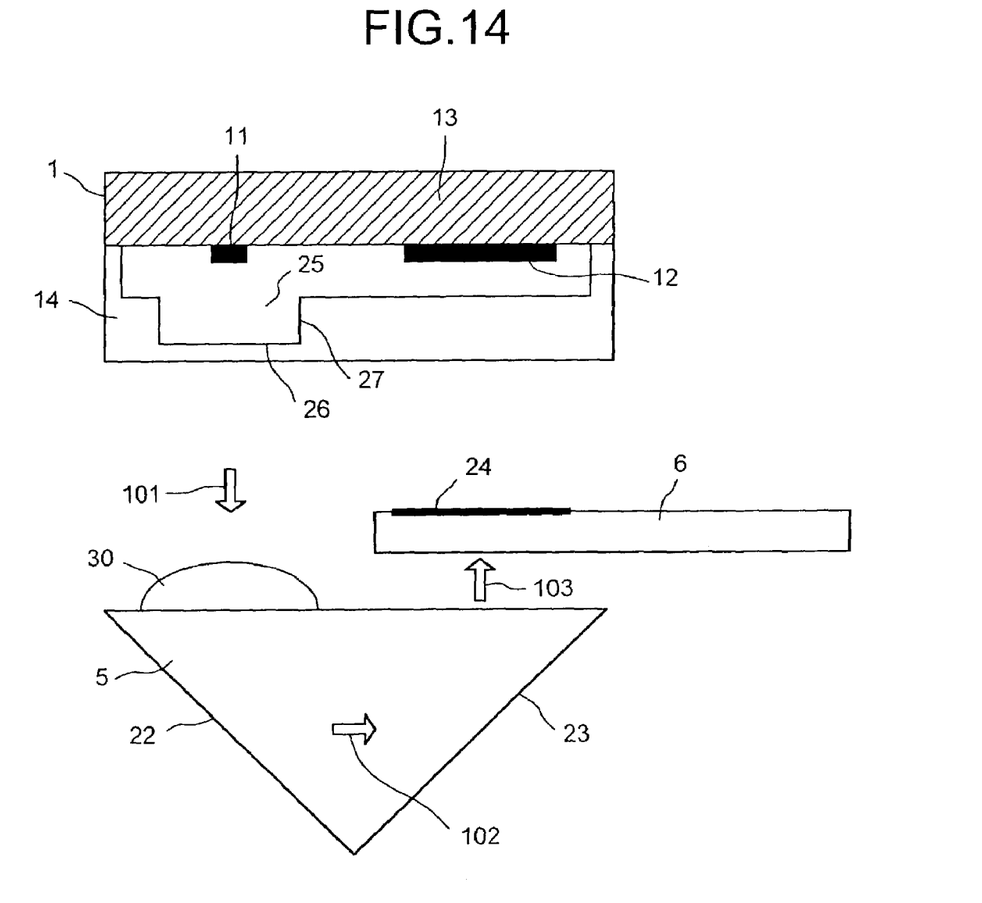
FIG. 14 is a schematic structure diagram of a main section of a photoelectric rotary encoder according to an eleventh embodiment of the present invention.

FIG. 14 is a schematic structure diagram of a main section of a photoelectric rotary encoder according to an eleventh embodiment of the present invention. The structure of the photoelectric rotary encoder is different from that of the first embodiment shown in FIG. 1 in that the first lens on the surface of the optical element is deleted, and the second lens 30 is provided on the returning section 5. Other structures are similar to those of the first embodiment, and identical portions are attached with like reference numerals.

As a result, according to the eleventh embodiment, the surface of the optical element 14 is a flat surface, and the second lens 30 is provided on the returning section 5. Therefore, it is possible to obtain a photoelectric rotary encoder that has improved optical performance such as an enlarged irradiation diameter and improved parallelism, and that achieves easy designing of the encoder overcoming the trade-off with assembling accuracy of components.

In the eleventh embodiment, while the surface of the optical element 14 is flat, and the second lens 30 is provided on the returning section 5, the position of providing this lens is not limited to the returning section 5. For example, It is also possible to obtain a similar effect when the lens is provided on the aperture 26 of the cylindrical cavity 25 of the optical element 14.

The eleventh embodiment employs the structure that the surface of the optical element 14 is flat, and the second lens 30 is provided on the returning section 5. It is also possible to apply this structure to any one of the third, seventh, and eighth to tenth embodiments of the present invention. In this case, it is also possible to obtain a similar effect to that of the eleventh embodiment.

As explained above, according to the present invention, a light source and a photodetector are arranged on a substrate, and an optical element is disposed and integrated in front of the substrate to cover this substrate. This optical element can let a stray beam component of a beam incident from the light source escape to the outside via the side of the optical element. Therefore, it is possible to remove unnecessary beams without requiring a light shielding plate. Consequently, it is possible to obtain a photoelectric rotary encoder that has a reduced number of parts. Since the light source and the photodetector are mounted on the same substrate, it is possible to obtain the photoelectric rotary encoder that has a compact light source and detection module and that ensures easy designing of the encoder based on simple adjustment between the light source and the photodetector.

Moreover, according to the present invention, concavities are formed on the substrate, and these concavities shield a stray beam component of a beam that is directed from the light source to the photodetector. Therefore, it is possible to remove unnecessary beams without requiring a light shielding plate. Consequently, it is possible to obtain a photoelectric rotary encoder that has a reduced number of parts. Since the light source and the photodetector are mounted on the same substrate, it is possible to obtain the photoelectric rotary encoder that has a compact light source and detection module and that ensures easy designing of the encoder based on simple adjustment between the light source and the photodetector.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A photoelectric rotary encoder comprising:
   a disk having a detection pattern;
   a substrate located on a first side of the disk;
   a light source located on the substrate and emitting a light beam;
   a first optical element located on a second side of the disk, opposite the first side and guiding the light beam toward the substrate when the light beam passes through the detection pattern;

a first photodetector located on the substrate and detecting the light beam when the light beam passes through the detection pattern to detect rotational displacement of the disk, and a second optical element integrated into the substrate, located at the first side of the disk, and guiding stray light beam components of the light beam out of the second optical element by total reflection within the second optical element so that the stray light beam components do not reach the first photodetector.

2. The photoelectric rotary encoder according to claim 1, wherein the second optical element has a concavity at an inner surface, facing the light source.

3. The photoelectric rotary encoder according to claim 2, wherein the concavity has a diameter and further comprising a first lens with a diameter larger than the diameter of the concavity and located at an outer surface of the second optical element to condense the beam passing through the concavity.

4. The photoelectric rotary encoder according to claim 3, further comprising a second lens that on the bottom face of a concavity to condense the light beam.

5. The photoelectric rotary encoder according to claim 2, wherein the concavity has a light shielding pattern at a bottom face of the concavity for changing shape of the light beam.

6. The photoelectric rotary encoder according to claim 2, wherein the second optical element has slits at an inner face facing the photodetector, and V-shape grooves between adjacent slits.

7. The photoelectric rotary encoder according to claim 3, further comprising a third lens located on a surface of the first optical element on which the beam is incident, to condense the beam.

8. The photoelectric rotary encoder according to claim 2, wherein the first optical element has a light shielding pattern at a surface of the first optical element, from which the light beam exits, changing shape of the light beam.

9. The photoelectric rotary encoder according to claim 1, wherein the substrate has a concavity, and the light source is located on a bottom face of the concavity.

10. The photoelectric rotary encoder according to claim 9, wherein the concavity has a depth to shield the first photodetector from the stray light beam components.

11. The photoelectric rotary encoder according to claim 1, wherein the second optical element is polycarbonate having a refractive index of 1.58.

12. The photoelectric rotary encoder according to claim 1, wherein the first optical element includes a phase grating that branches the light beam into a first light beam and a second light beam, and guides the first and second light beams towards the substrate, the first photodetector detects the first light beam when the first light beam passes through the detection pattern to detect rotational displacement of the disk, and the encoder further comprises a second photodetector located on the substrate and detecting the second light beam when the second light beam passes through the detector pattern, to detect the rotational displacement of the disk.

13. The photoelectric rotary encoder according to claim 12, wherein the second optical element has a concavity at an inner surface, facing the light source.

14. The photoelectric rotary encoder according to claim 13, wherein the concavity has a diameter and further comprising a first lens with a diameter larger than the diameter of the concavity and at an outer surface of the second optical element to condense the light beam passing through the concavity.

15. The photoelectric rotary encoder according to claim 12, wherein the second optical element is polycarbonate having a refractive index of 1.58.

* * * * *